United States Patent

Taki et al.

[11] Patent Number: 5,809,406
[45] Date of Patent: Sep. 15, 1998

[54] RECEIVING APPARATUS AND METHOD FOR SWITCHING BETWEEN ACTIVE AND STANDBY RECEIVERS

[75] Inventors: Yoshihiko Taki, Sendai; Kenichi Oide, Kawasaki, both of Japan

[73] Assignee: Fujitsu Limited, Kanagawa, Japan

[21] Appl. No.: 522,021

[22] Filed: Aug. 31, 1995

[30] Foreign Application Priority Data

Dec. 15, 1994 [JP] Japan .................................. 6-312224

[51] Int. Cl.⁶ ........................................ H04B 7/08
[52] U.S. Cl. ..................... 455/135; 455/136; 375/232; 375/349
[58] Field of Search ............... 455/277.1, 277.2, 455/133, 135, 136; 375/232, 347, 349, 350, 233

[56] References Cited

U.S. PATENT DOCUMENTS

| 5,203,027 | 4/1993 | Nounin et al. ....................... 455/134 |
| 5,530,925 | 6/1996 | Garner ................................. 375/347 X |

FOREIGN PATENT DOCUMENTS

| 0 104 486 | 4/1984 | European Pat. Off. . |
| OS 32 32 668 | 3/1984 | Germany . |
| 4-167838 | 6/1992 | Japan . |

Primary Examiner—Chi H. Pham
Attorney, Agent, or Firm—Helfgott & Karas, PC.

[57] ABSTRACT

Herein disclosed are a radio receiving apparatus and a receiving system switching control method used in the radio receiving apparatus. The radio receiving apparatus has an active receiving system and a standby receiving system including respective equalizers, and a changeover switch for performing a switching between the active receiving system and the standby receiving system. The radio receiving apparatus further includes an alarm predicting information predicting means for detecting alarm predicting information in each of the equalizers and a switching control means for controlling a switching condition of the changeover switch on the basis of the alarm predicting information detected by the alarm predicting information detecting means, where the alarm predicting information as internal information of the equalizers is monitored to predict a malfunction of a receiving circuit to switch the circuit before the circuit is hit. It is therefore possible to reduce a hit rate of the circuit.

10 Claims, 12 Drawing Sheets

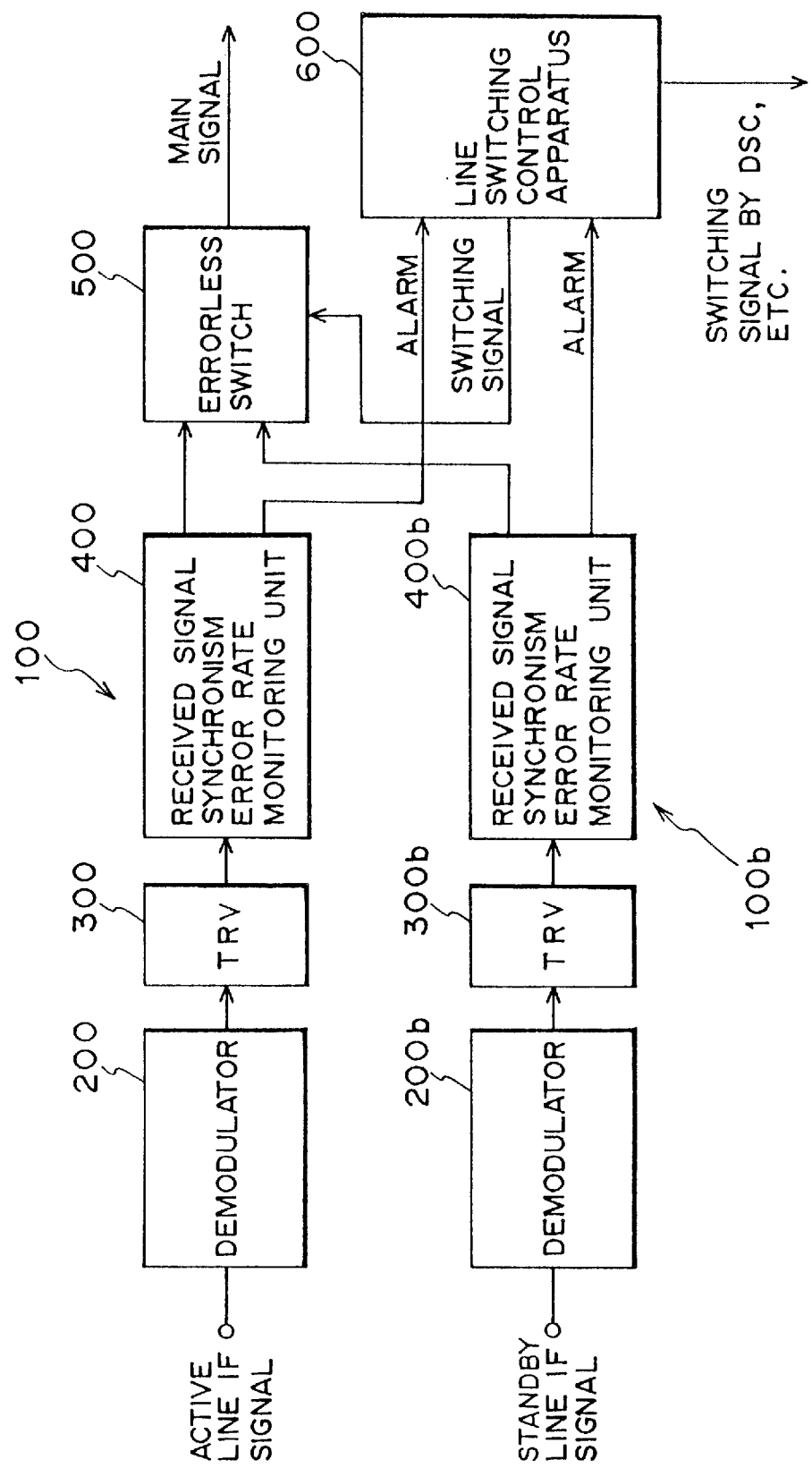

RECEIVING APPARATUS AND METHOD FOR SWITCHING BETWEEN ACTIVE AND STANDBY RECEIVERS

BACKGROUND OF THE INVENTION

FIELD OF THE INVENTION

The present invention relates to a radio receiving apparatus in which a transmission line of a receiving system can be switched from an active line to a standby line, and a receiving system switching control method used in such radio receiving apparatus.

FIG. 12 is a block diagram showing a structure of a radio receiving apparatus known in the art. As shown in FIG. 12, an active line 100 has a demodulator 200, a transversal equalizer (TRV) 300 and a received signal synchronism error rate monitoring unit 400. A standby line 100b has a demodulator 200b, a transversal equalizer (TRV) 300b and a received signal synchronism error rate monitoring unit 400b as redundancies of the above parts.

An errorless switch 500 is provided on an output side of the received signal synchronism error rate monitoring unit 400 (400b). Further, a line switching control apparatus 600 is also provided on the output side of the received signal synchronism error rate monitoring unit 400 (400b).

The demodulator 200 (200b) demodulates a received signal in an IF band (an intermediate frequency band), and outputs it as a baseband signal to the transversal equalizer 300 (300b). The transversal equalizer 300 (300b) equalizes the received signal in the baseband having been demodulated by the demodulator 200 (200b) in a time-domain.

The received signal synchronism error rate monitoring unit 400 (400b) monitors an error rate of the received signal having been equalized by the transversal equalizer 300 (300b), and outputs a signal having been subjected to a correction in regard to an error such as an out of synchronism of the received signal to the errorless switch 500, besides outputting a degree of the error correction (an error rate) as error rate monitoring information to the line switching control apparatus 600. As a manner to monitor an error rate, there are an error rate monitoring by means of a parity coefficient, a monitoring of an error rate utilizing an error correction bit such as an FEC, etc.

The errorless switch 500 performs a switching between the active line 100 and the standby line 100b based on an instruction from the line switching control apparatus 600. The line switching control apparatus 600 judges whether there is a necessity to switch the transmission line from the active line 100 to the standby line 100b on the basis of the error rate monitoring information from the received signal synchronism error rate monitoring unit 400 (400b). If there is a necessity for a switching, the line switching control apparatus 600 sends out a switching signal to the errorless switch 500 to control a switching between the active line 100 and the standby line 100b.

In the radio receiving apparatus known in the art with the above structure, the received signal synchronism error rate monitoring unit 400 monitors an error rate of the received signal having been equalized by the transversal equalizer 300 by means of a parity coefficient of a parity bit, or by utilizing an error-correction bit such as an FEC, and the obtained error rate monitoring information is sent to the line switching control apparatus 600.

The line switching control apparatus 600 judges whether there is a necessity to switch the active line 100 to the standby line 100b on the basis of the error rate information.

In practice, it is judged whether a bit error rate (BER) from the received signal synchronism error rate monitoring unit 400 is a sufficiently desired value (this value is said to be approximately $1 \times 10^{-7}$ or less, in general) or not.

If the bit error rate exhibits a value of a sign that a tap coefficient of the transversal equalizer 300 overflows to disconnect the active line 100 (approximately from $1 \times 10^{-7}$ to $1 \times 10^{-3}$, in general), the line switching control apparatus 600 outputs a circuit switching signal to the errorless switch 500, whereby the errorless switch 500 switches the active line 100 to the standby line 100b.

As above, the radio receiving apparatus known in the art switches the circuit from the active line 100 to the standby line 100b before the active line 100 becomes abruptly unusable and is disconnected.

If a selective fading added in a space occurs in data of the received signal because of an increase of the number of taps in the recent transversal equalizer 300 (300b) or an improvement in performance of equalization or technique of equalization of the equalizer such as a decision feedback equalizer (DFE) in the above-described radio receiving apparatus known in the art, data inputted from the transversal equalizer 300 (300b) to the received signal synchronism error rate monitoring unit 400 (400b) has a transmission quality largely different from that of data inputted from the demodulator 200 (200b) to the transversal equalizer 300 (300b).

If data which has been equalized by the transversal equalizer 300 (300b) and whose transmission distortion has been compensated to a certain degree is monitored by the received signal synchronism error rate monitoring unit 400 (400b) as before, it may happen that no sign of malfunction of the circuit appears until data in excess of a capacity for equalization of the transversal equalizer 300 (300b) is inputted and a tap coefficient of the transversal equalizer 300 (300b) therefore overflows.

If a distortion such as a fading of the received signal increases, it may happen that the carrier synchronism abruptly comes off without showing a value exhibiting a sign of malfunction of the line (approximately from $1 \times 10^{-3}$ to $1 \times 10^{-7}$) from a state where the bit error rate in the received signal synchronism error rate monitoring unit 400 (400b) is a value showing a sufficiently desired condition (approximately $1 \times 10^{-7}$ or less), and the line is hit before the line switching control apparatus 600 switches the line.

SUMMARY OF THE INVENTION

To overcome the above problem, an object of this invention is to provide a radio receiving apparatus and a receiving system switching control method used in the radio receiving apparatus, where a malfunction of a receiving circuit is predicted before the circuit is hit by monitoring alarm predicting information as internal information of an equalizer, thereby reducing a hit rate of the circuit.

The present invention therefore provides a radio receiving apparatus having an active receiving system and a standby receiving system having respective equalizers and a changeover switch for performing a switching between said active receiving system and said standby receiving system comprising an alarm predicting information detecting means for detecting alarm predicting information in each of said equalizers, and a switching control means for controlling a switching condition of said changeover switch on the basis of said alarm predicting information detected by said alarm predicting information detecting means.

According to the radio receiving apparatus according to this invention, the alarm predicting information in each of the equalizers is detected and a switching condition of the changeover switch is controlled on the basis of the alarm predicting information, thereby predicting an abrupt disconnection of the active receiving system to switch the active receiving system over to the standby receiving system before the abrupt disconnection. It is therefore possible to largely reduce a hit rate of the receiving system even if a high-performance equalizer is used therein.

The present invention also provides a method for switching receiving systems in a radio receiving apparatus having an active receiving system and a standby receiving system having respective equalizers and a changeover switching for performing a switching between said active receiving system and said standby receiving system comprising the steps of detecting alarm predicting information in each of said equalizers, and controlling a switching condition of said changeover switch on the basis of the alarm predicting information.

According to the receiving system switching control method used in the radio receiving apparatus according to this invention, it is possible to switch the receiving system from the active receiving system to the standby receiving system in prior, thereby largely reducing a hit rate of the receiving system even if a high-performance equalizer is used therein.

BRIEF DESCRIPTION OF THE DRAWINGS

FIG. 12 is a block diagram of a general radio receiving apparatus.

Figure 1:
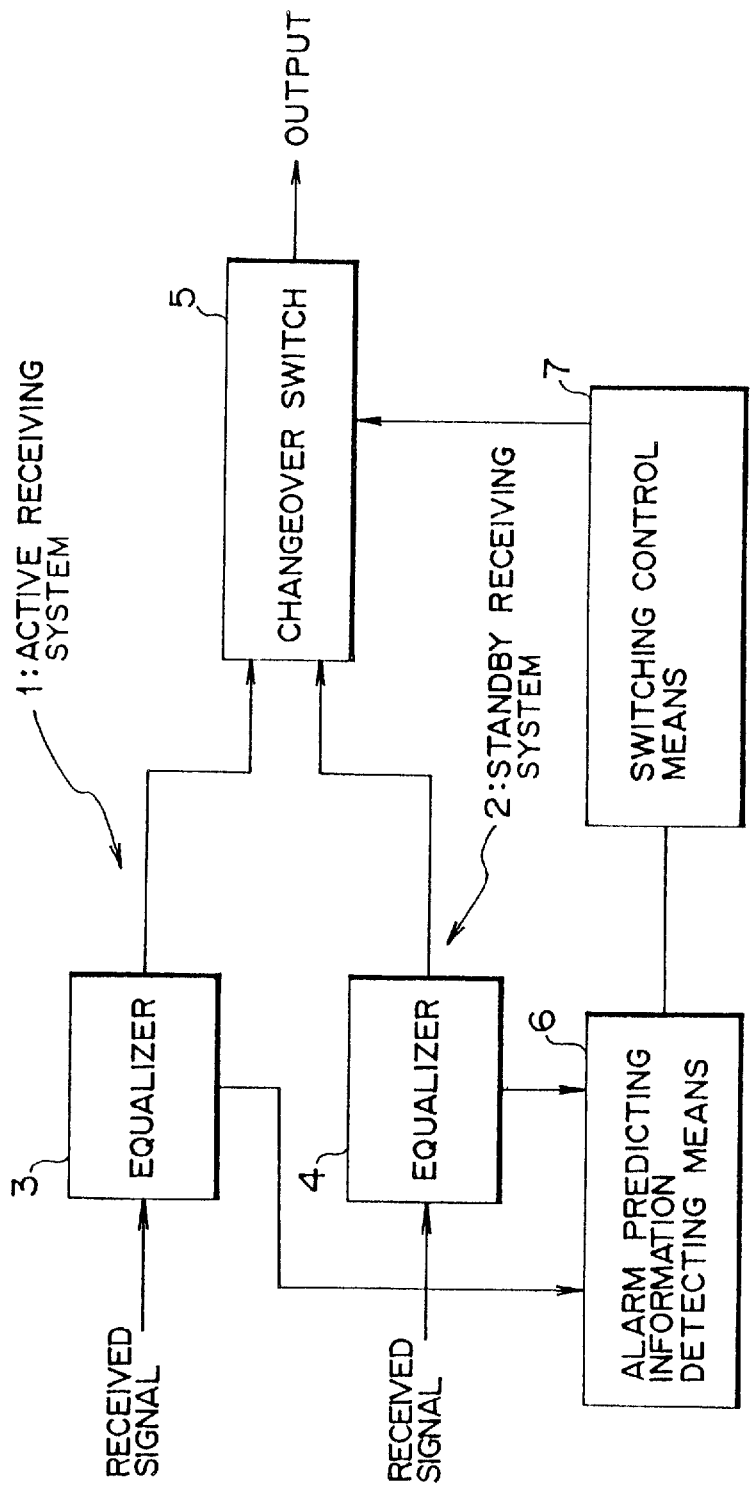
FIG. 1 is a block diagram showing an aspect of this invention.

DESCRIPTION OF THE PREFERRED EMBODIMENTS (a) Description of Aspect of the Invention Now, description will be made of an aspect of this invention referring to the drawings.

FIG. 1 is a block diagram showing the aspect of this invention. In FIG. 1, reference numeral 1 denotes an active receiving system, 2 denotes a standby receiving system, and 3 and 4 denote equalizers. As shown in FIG. 1, the equalizer 3 is provided in the active receiving system 1, while the equalizer 4 is provided in the standby receiving system 2. Reference numeral 5 denotes a changeover switch for performing a switching between the active receiving system 1 and the standby receiving system 2, reference numeral 6 denotes an alarm predicting information detecting means, and 7 denotes a switching control means.

The alarm predicting information detecting means 6 detects alarm predicting information in each of said equalizers 3 and 4. The switching control means 7 controls a switching condition of the changeover switch 5 on the basis of the alarm predicting information detected by the alarm predicting information detecting means 6.

In the above-mentioned radio receiving apparatus of this invention, the alarm predicting information detecting means 6 detects the alarm predicting information in each of the equalizers 3 and 4, and the switching control means 7 controls a switching condition of the changeover switch 5 on the basis of the alarm predicting information detected by the alarm predicting information detecting means. It is therefore possible to switch the active receiving system 1 to the standby receiving system 2 before a malfunction occurs in the active receiving system 1.

According to the above-described radio receiving system of this invention, it is possible to largely reduce a hit rate of the receiving system even if a high-performance equalizer is used in this radio receiving apparatus.

The switching control means 7 stated above has a switching reference information setting unit for setting switching reference information, a comparing unit and a control unit. In this case, the comparing unit compares the alarm predicting information detected by the alarm predicting information detecting means 6 with the switching reference information set by the switching reference information setting unit, and the control unit controls a switching condition of the changeover switch 5 on the basis of a result of comparison by the comparing unit.

In the switching control means 7, the comparing unit may compare the alarm predicting information detecting by the alarm predicting information detecting means 6 with the switching reference information set by the switching reference information setting unit, and the control unit may control a switching condition of the changeover switch 5 on the basis of a result of the comparison by the comparing unit.

According to the radio receiving apparatus described above, it is possible to certainly control a switching condition of the changeover switch 5 with a simple structure.

The above switching reference information setting unit is so configured as to be able to set alarm activation switching reference information and alarm cancellation switching reference information, and includes a switching unit. In this case, the switching unit selects the alarm activation switching reference information until the alarm predicting information detected by the alarm predicting information detecting means 6 exceeds the alarm activation switching reference information, sets the alarm cancellation switching reference information when the alarm predicting information exceeds the alarm activation switching reference information, and again switches to the alarm activate reference information when the alarm predicting information drops below the alarm cancellation switching reference information.

In the above-described switching reference information setting unit, the alarm activation switching reference information is selected as the switching reference information by the switching unit until the alarm predicting information detected by the alarm predicting information detecting means 6 exceeds the alarm activation switching reference information, and the alarm is activated when the alarm predicting information exceeds the alarm activation switching reference information. Simultaneously, the switching unit sets the alarm cancellation reference information as the switching reference information. When the alarm predicting information drops below the alarm cancellation reference information, the switching unit again switches the switching reference information to the alarm activation switching reference information so that the activated alarm is cancelled.

According to the above radio receiving apparatus according to this invention, it is possible to certainly perform a switching between the active receiving system 1 and the standby receiving system 2.

In the above case, the above alarm activation switching reference information is set at a level equal to or higher than the alarm cancellation reference information, whereby hunting upon a switching between the active receiving system 1 and the standby receiving system 2 may be effectively prevented.

In practice, the above alarm predicting information detecting means is configured as a tap coefficient detecting means for detecting tap coefficients in each of the equalizers 3 and 4. The switching control means is so configured as to control a switching condition of the changeover switch 5 on the basis of the tap coefficients detected by the tap coefficient detecting means.

As above, it is possible to detect the tap coefficients of the equalizers 3 and 4 by the tap coefficient detecting means and control a switching condition of the changeover switch 5 by the switching control means 7 on the basis of the tap coefficients detected by the tap coefficient detecting means.

According to the radio receiving apparatus of this invention, it is possible to readily detect the tap coefficients of the equalizers 3 and 4 as the alarm predicting information and obtain more accurate alarm predicting information.

The above tap coefficient detecting means is configured with a selector for selecting tap coefficients obtained from the equalizer 3 or 4 and a tap coefficient selection control unit for controlling selection of the tap coefficients by the selector. The switching control means 7 is configured with a switching reference level setting unit, a switching reference level setting unit, a comparing unit for comparing an output from the selector in said tap coefficient detecting means with a switching reference level set by the switching reference level setting unit, and a control unit for controlling a switching condition of the changeover switch 5 on the basis of a result of comparison by the comparing unit.

At that time, the above tap coefficient selection control unit is so configured that the tap coefficient having been selected when the output of the selector exceeded the switching reference level is continuously outputted.

It is thereby possible that the selector selects the tap coefficients obtained from the equalizer 3 or 4, and the tap coefficient selection control unit controls selection of the tap coefficients by the selector. Simultaneously, it is possible that the comparing unit compares an output of the selector in the above tap coefficient detecting means with a switching reference level set by the switching reference level setting unit, and the control unit controls a switching condition of the changeover switch 5 on the basis of a result of comparison by the comparing unit.

The above tap coefficient selecting unit controls the selector to continuously output the tap coefficient having been selected when the output of the selector exceeded the switching reference level.

According to the radio receiving apparatus of this invention, it is therefore possible to perform a switching between the active receiving system 1 and the standby receiving system 2 with a simple structure.

The above alarm predicting information detecting means may be configured as a tap coefficient detecting means for detecting simultaneously plural tap coefficients in the equalizers 3 and 4. In which case, the switching control means 7 is so configured as to control a switching condition of the changeover switch 5 on the basis of the plural tap coefficients detected by the tap coefficient detecting means.

It is thereby possible to control a switching condition of the changeover switch 5 on the basis of the plural tap coefficients detected by the tap coefficient detecting means.

According to the radio receiving apparatus of this invention, it is therefore possible to switch the changeover switch 5 on the basis of more accurate alarm predicting information.

The above tap coefficient detecting means may have plural selectors and a tap coefficient selection control unit for controlling selection of the tap coefficients by the selectors so as to simultaneously detect the plural tap coefficients from the equalizers 3 and 4. In which case, the switching control means 7 has a switching reference level setting unit, a comparing unit for comparing an output from each of the selectors in the tap coefficient detecting means with a switching reference level set by the switching reference level setting unit, and a control unit for controlling a switching condition of said changeover switch on the basis of a result of comparison by the comparing unit.

In the above case, the tap coefficient selection control unit so controls that tap coefficients having been selected when an output of the selector exceeded the switching reference level are continuously outputted.

In the switching control unit 7, the comparing unit may compare an output from each of the selectors in the tap coefficient detecting means with a switching reference level set by the switching reference level setting unit, and the control unit may control a switching condition of the changeover switch 5 on the basis of a result of comparison by the comparing unit so as to switching a circuit between the active receiving system 1 and the standby receiving system 2.

In the above case, the tap coefficient control unit so controls that tap coefficients having been selected when the an output of the selector exceeded the switching reference level are continuously outputted.

According to the radio receiving apparatus of this invention, it is possible to certainly switch the circuit between the active receiving system 1 and the standby receiving system 2 with an extremely simple structure.

In practice, the above switching reference information setting unit is so configured as to be able to set plural switching reference levels. At the same time, the above comparing unit has plural comparators for comparing outputs from the selectors with required changing reference levels, respectively, and an AND circuit for obtaining an AND of results of comparison by the comparing units.

It is thereby possible that each of the comparators compares the required switching reference level set by the switching reference level setting unit with an output of the corresponding selector in the tap coefficient detecting means, and the AND circuit obtains an AND of results of comparison by the comparators to detect the alarm predicting information.

According to the radio receiving apparatus of this invention, it is possible to extremely readily accomplish the above-mentioned radio receiving apparatus with a simple structure.

Namely, in a receiving system switching control method used in a radio receiving apparatus according to this invention, in brief, in the radio receiving apparatus shown in FIG. 1, alarm predicting information in each of the equalizers 3 and 4 is detected and a switching condition of the changeover switch 5 is controlled on the basis of the detected alarm predicting information.

In the above control method, the alarm predicting information of each of the equalizers 3 and 4 is detected and a switching condition of the changeover switch 5 is controlled on the basis of the alarm predicting information, thereby switching in prior the receiving system from the active receiving system 1 to the standby receiving system 2.

According to the receiving system switching control method used in a radio receiving system of this invention, it is possible to largely reduce a hit rate of the receiving system even if a high-performance equalizer is used in the above radio receiving apparatus.

(b) Description of First Embodiment of the Invention

Now, description will be made of a first embodiment of this invention referring to the drawings.

Figure 2:
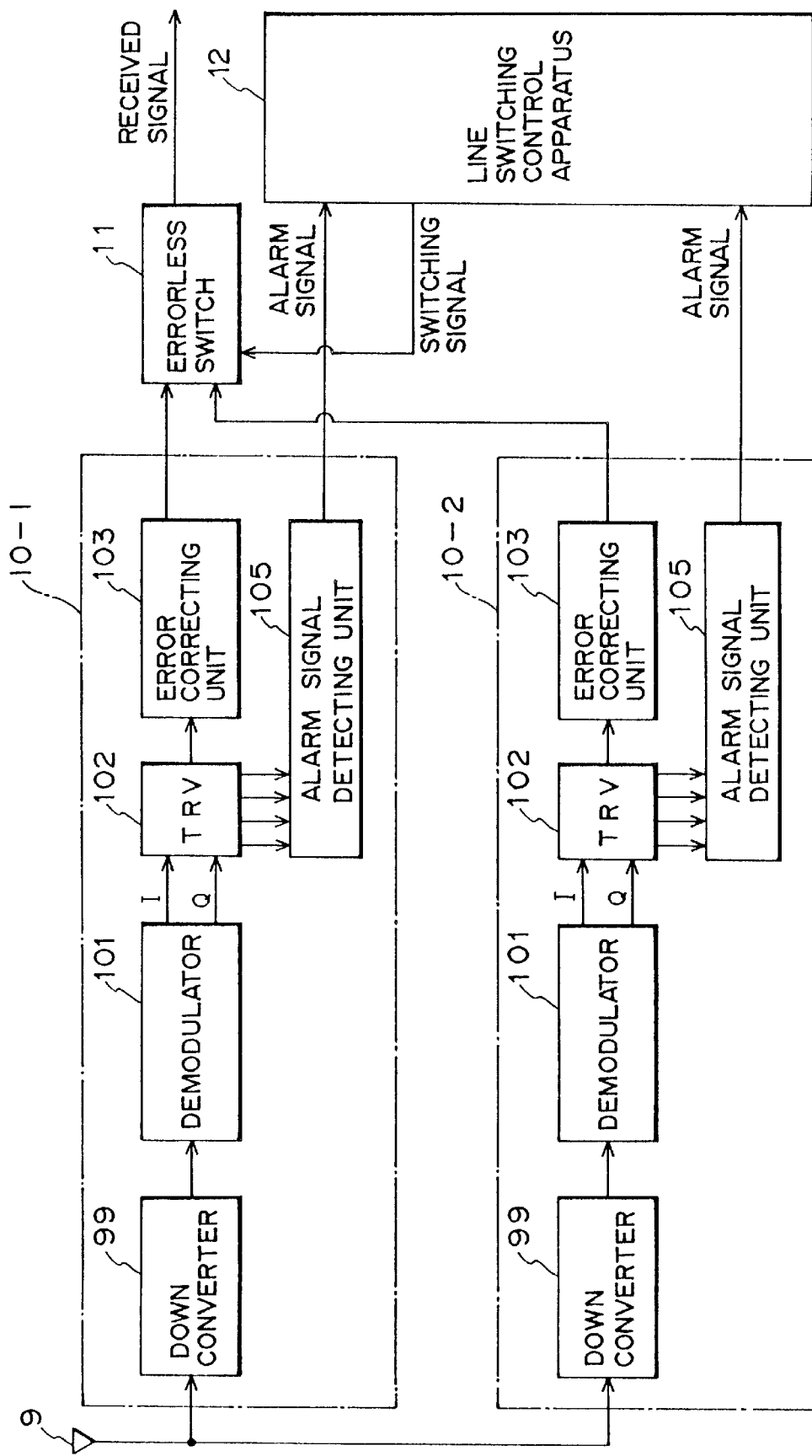
FIG. 2 is a block diagram of a radio receiving apparatus according to a first embodiment of this invention.

FIG. 2 is a block diagram showing a structure of a radio receiving apparatus as the first embodiment of this invention. In FIG. 2, reference numeral 9 denotes an antenna, 10-1 denotes an active receiving system, 10-2 denotes a standby receiving system as a redundancy for the active receiving system 10-1, 11 denotes an errorless switch, and 12 denotes a line switching control apparatus.

The errorless switch (a changeover switch) 11 receives a switching signal from the line switching control apparatus 12 described later to control the switching condition, thereby switching a transmission path for a received signal from the active receiving system 10-1 to the standby receiving system 10-2. The line switching control apparatus 12 outputs a switching signal for switching a switching condition of the errorless switch 11 to the errorless switch 11 on the basis of an alarm signal obtained in an alarm signal detecting unit 105 in the receiving system 10-1 or 10-2 described later.

The active receiving system 10-1 has a down converter 99, a demodulator 101, a transversal equalizer (TRV; equalizer) 102, an error correcting unit 103 and the alarm signal detecting unit 105. The standby receiving system 10-2 also has the elements similar to those of the active receiving system 10-1.

The down converter 99 converts the received signal in an RF band (a radio frequency band) received by the antenna 9 into a signal in an IF band (an intermediate frequency band). The demodulator 101 demodulates the received signal in the IF band from the down converter 99 to obtain two sorts of quadrature baseband signals, and outputs them as an I channel signal and a Q channel signal to the transversal equalizer 102. The transversal equalizer 102 equalizes the I and Q channel signals from the demodulator 101 in respective time-domains to compensate transmission distortion of the received signal. Detailed description of a structure of the transversal equalizer will be made later.

The error correcting unit 103 corrects an error such as an error bit in output data from the transversal equalizer 102 using a method such as the FEC. The alarm signal detecting unit 105 obtains plural tap coefficients in the transversal equalizer 102. If there is a tap coefficient (alarm predicting information) which is likely to overflow among them, the alarm signal detecting unit 105 detects the alarm signal and outputs it to the line switching control apparatus 12.

In the radio receiving apparatus of this embodiment with the above structure, when the transversal equalizer 102 equalizes the received signal from the antenna 9 to compensate transmission distortion of the received signal, the alarm signal detecting unit 105 obtains plural tap coefficients of the transversal equalizer 102 and monitors these tap coefficients so as to output the alarm signal to the line switching control apparatus 12 if there is a tap coefficient which is likely to overflow among them.

When receiving the alarm signal, the line switching control unit 12 recognizes that there is a sign of a disconnection of the active receiving system 10-1 because of overflow of any one of the plural tap coefficients of the transversal equalizer 102. The switching signal is sent out to the errorless switch 11 based on it. The errorless switch 11 switches the transmission path for the received signal from the active receiving system 10-1 to the standby receiving system 10-2.

In the above operation, an operation to detect the alarm signal from the tap coefficients of the transversal equalizer 102 will be next described in detail.

Figure 3:
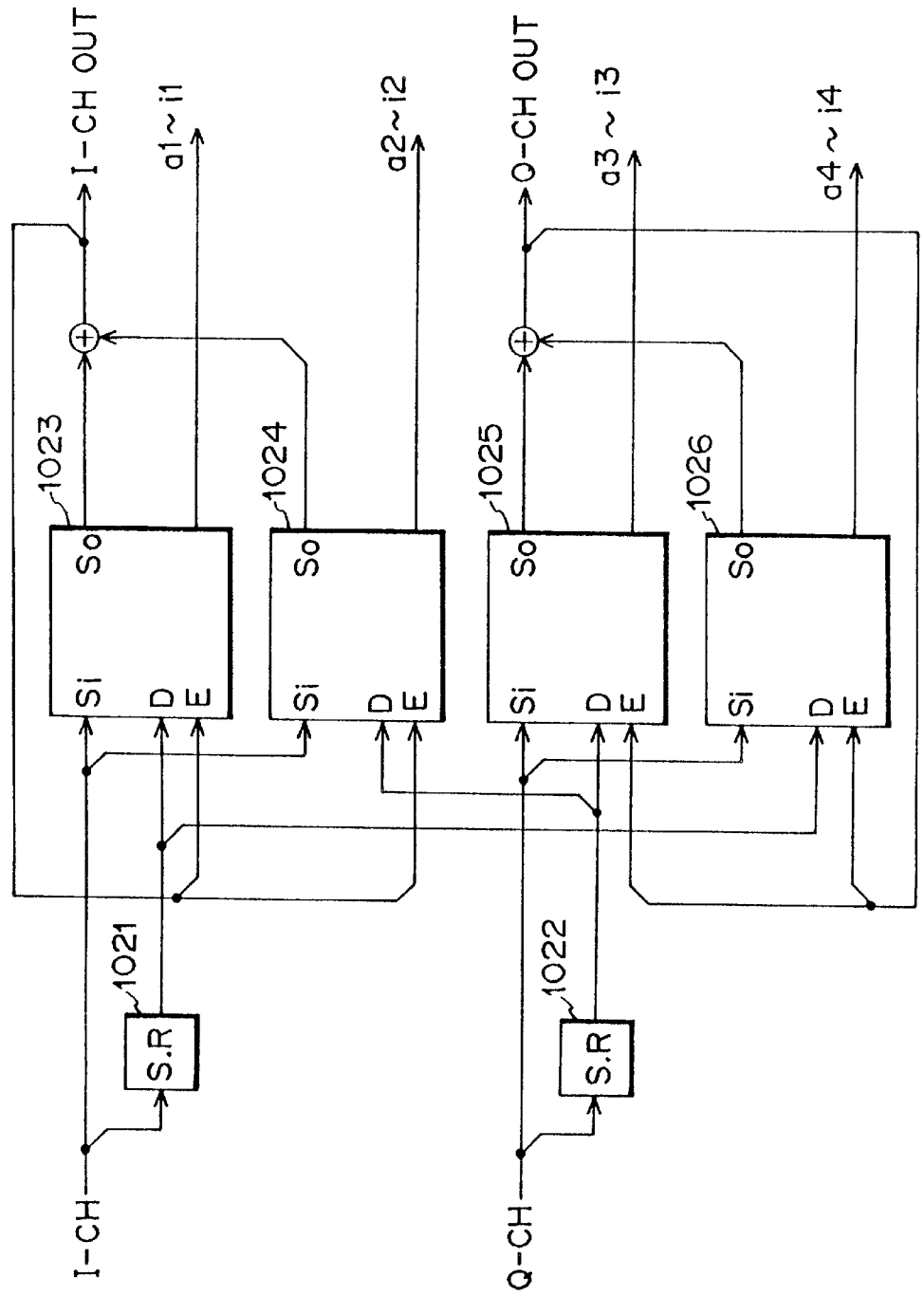
FIG. 3 is a block diagram of a transversal equalizer according to the first embodiment.

In order to equalize the I and Q channel signals from the demodulator 101 in the respective time-domains as above, the transversal equalizer 102 is configured with shift registers (SRs) 1021 and 1022 and transversal filters 1023 through 1026 (equalizers of an adaptive type) for equalizing the I channel signal or the Q channel signal in a corresponding time-domain, as, for example, shown in FIG. 3.

The transversal filter 1023 feeds back its own output data (So) as error information (E) so as to compensate components of intersymbol interference of input data (Si) of the I channel signal. The transversal filter 1024 compensates components of quadrature interference of input data (Si) of the I channel signal using error data (E) from the above transversal filter 1023.

On the other hand, the transversal filter 1025 feeds back its own output data (So) as error data (E) so as to compensate components of intersymbol interference of input data (Si) of the Q channel signal, as well as the transversal filter 1023. The transversal filter 1026 compensates components of quadrature interference of input data (Si) of the I channel signal using error data (E) from the above transversal filter 1025.

The shift registers 1021 and 1022 temporarily store data (polarity information: D) inputted to the transversal filters 1023 and 1026 and the transversal filters 1024 and 1025 to delay it so as to coincide operation timings of the transversal filters 1023 through 1026.

Figure 4:
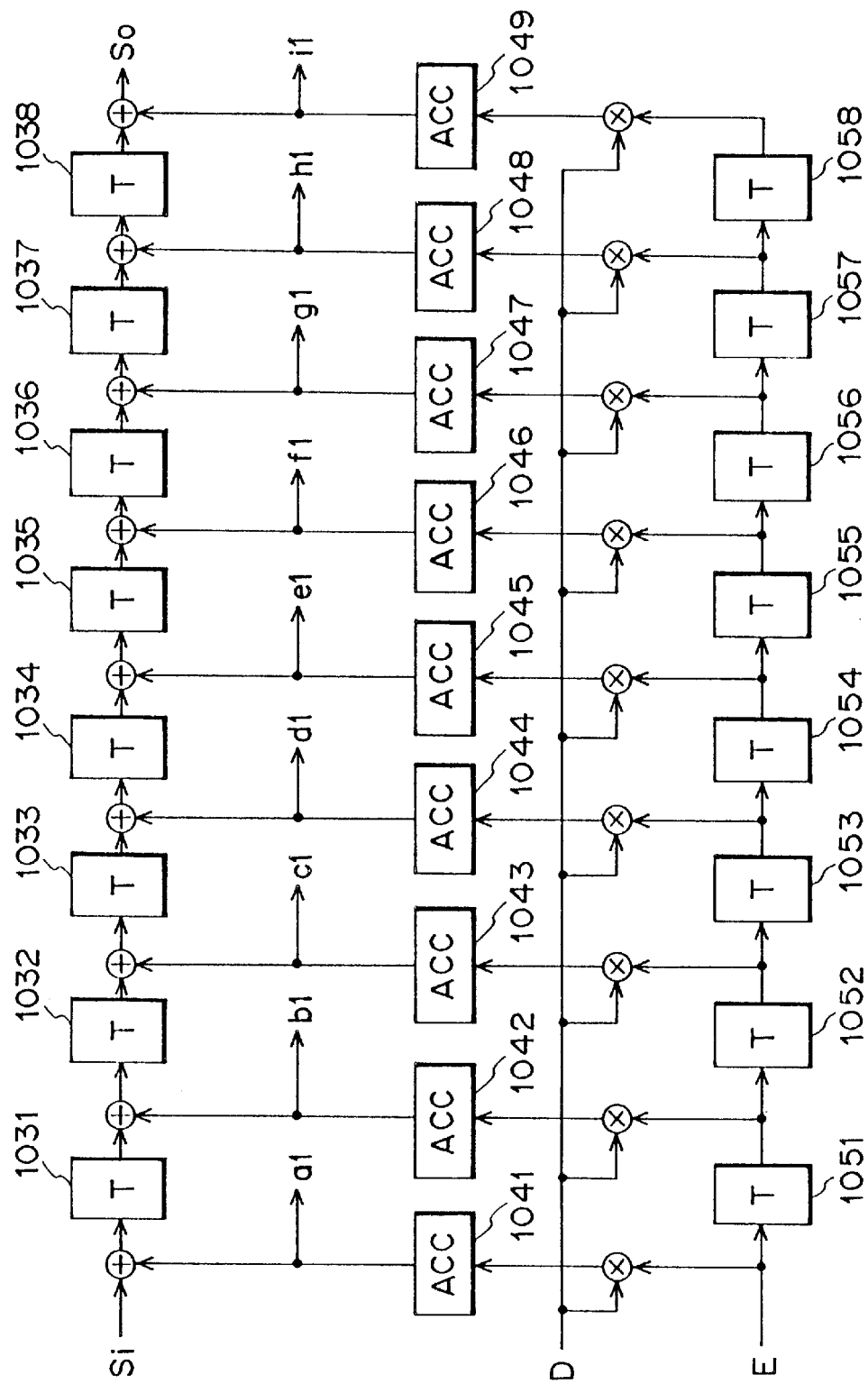
FIG. 4 is a block diagram of a transversal filter according to the first embodiment.
Figure 5:
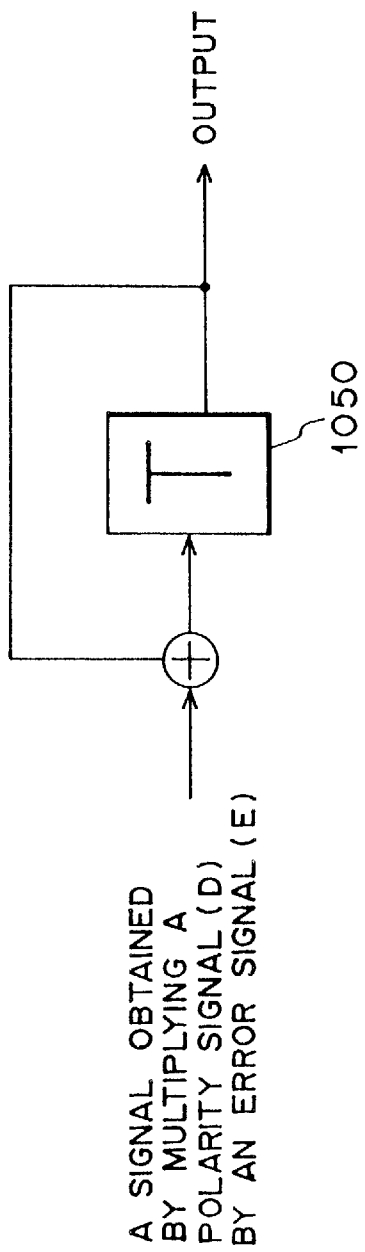
FIG. 5 is a block diagram of an accumulator circuit according to the first embodiment.

The transversal filter 1023 is configured with, for example, flip-flop circuits (Ts) 1031 through 1038 and 1051 through 1058 and accumulator circuits (ACCs) 1041 through 1049, as shown in FIG. 4. Each of the accumulator circuits 1041 through 1049 has one flip-flop circuit (T) 1050 to feed back an output of the flip-flop circuit 1050 and add it to an input, as shown in FIG. 5.

Each of the flip-flop circuits 1031 through 1038 delays the input data (Si) of the I or Q channel signal by one clock (1 CLK). Each of the flip-flop circuit 1051 through 1058 delays the error signal data (E) by one clock. Each of the accumulators 1041 through 1049 adds its own output to data obtained by multiplying the polarity data (D) by the error data (E) and outputs a part of a result of the addition as a corresponding tap coefficient a1, b1, . . . or i1.

The transversal filter 1023 with the above structure obtains data by multiplying each of the tap coefficient by the input data (Si), successively adds the obtained data and outputs the added data as the received signal, while outputting each of the tap coefficients a1 through i1 to the alarm signal detecting unit 105 (refer to FIG. 2). Each of the transversal filters 1024 through 1026 has a structure similar to that of the above transversal filter 1023, where the tap coefficient a2 through i2, a3 through i3, or a4 through i4 are outputted to the alarm signal detecting unit 105.

Figure 6:
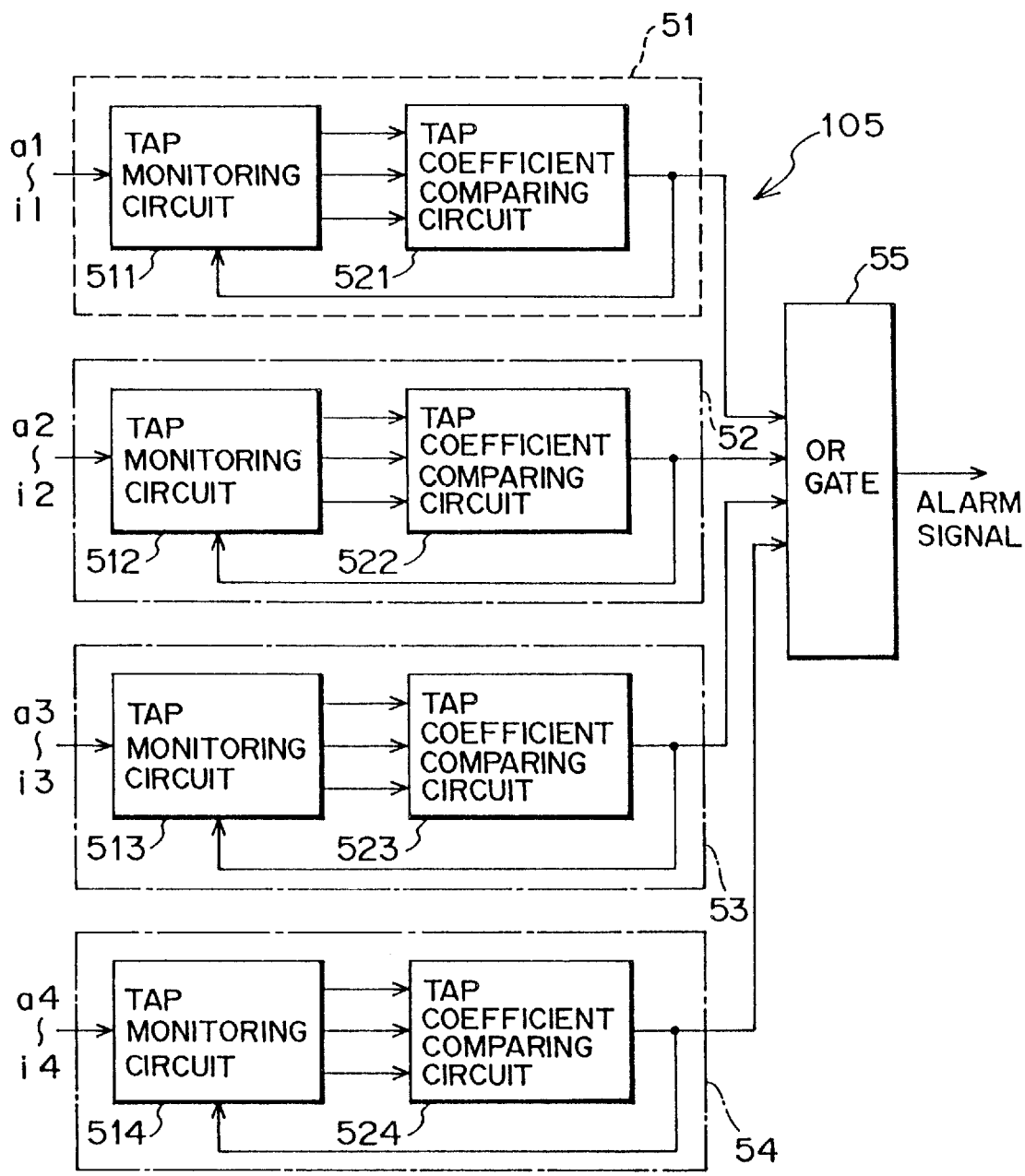
FIG. 6 is a block diagram of an alarm signal detecting unit according to the first embodiment.

The alarm signal detecting unit 105 is configured with four circuit units 51 through 54 in order to obtain alarm signals from respective tap coefficients a1 through i1, a2 through i2, a3 through i3 and a4 through i4 from the transversal equalizer 102, as shown in FIG. 6. The circuit units 51 through 54 have tap monitoring circuits 511 through 514, tap coefficient comparing circuits 521 through 524, respectively.

The tap monitoring circuits (tap coefficient detecting means as alarm predicting information detecting means) 511 through 514 detect the tap coefficients a1 through i1, a2 through i2, a3 through i3 and a4 through i4 in the transversal filters 1023 through 1024, respectively. Each of the tap coefficient comparing circuits (switching control means) 521 through 524 detects an alarm signal for controlling a switching condition of the errorless switch 11 on the basis of the tap coefficient a1 through i1, a2 through i2, a3 through i3 or a4 through i4 detected in the corresponding tap monitoring circuit 511 through 514. Incidentally, reference numeral 55 denotes an OR gate, which outputs an alarm signal if even one alarm signal is detected in the circuit units 51 through 54.

Figure 7:
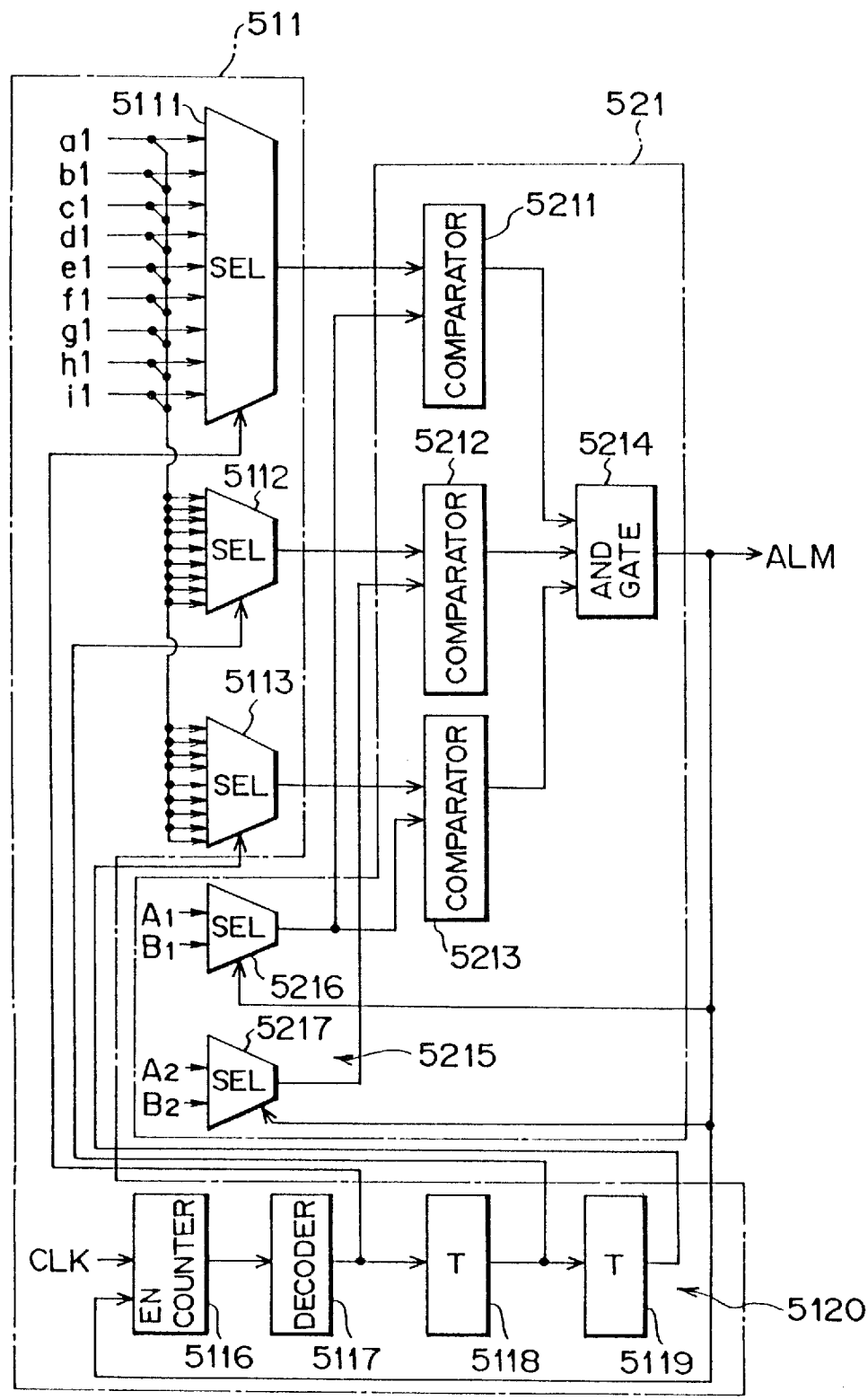
FIG. 7 is a block diagram of a tap monitoring circuit and a tap coefficient comparing circuit according to the first embodiment.

For this end, the tap monitoring circuit 511 of the circuit unit 51, for example, has selectors (SELs) 5111 through 5113 and a tap coefficient selection control unit 5120, as shown in FIG. 7. The tap coefficient comparing circuit 521 has comparators 5211 through 5213, an AND gate (an AND circuit) 5214 and a reference signal setting unit (a switching reference information setting unit) 5215. The tap coefficient selection control unit 5120 has a divide-by-9 counter 5116, a decoder 5117, flip-flop circuits (Ts) 5118 and 5119. The reference signal setting unit 5215 has selectors 5216 and 5217.

Each of the selectors 5111 through 5113 selects a tap coefficient among the tap coefficients a1 through i1, which is different from coefficients selected by another selectors, according to a control signal from the tap coefficient selection control unit 5120, and outputs it. The tap coefficient selection control unit 5120 selects an output signal of the counter 5116 by the decoder 5117, and outputs three signals each having been delayed by one clock (1 CLK) at the flip-flop circuits 5118 and 5119 to the respective selectors 5111 through 5113, thereby controlling the selectors 5111 through 5113 to select different coefficients continuously.

Each of the selectors 5216 and 5217 constituting the reference signal setting unit 5215 outputs an alarm activating reference signal (alarm activation switching reference information) A1 or A2, or an alarm cancelling reference signal (alarm cancellation switching reference information) B1 or B2 to the comparator(s) 5211 through 5213. The alarm activating reference signal A1 or A2 is set to a signal at a predetermined level lower than a signal level at which the transversal equalizer 102 comes to overflow if the tap coefficient increases more. The alarm cancelling reference signal B1 or B2 is set at a signal at a predetermined level lower than a signal level of the alarm activating reference signal A1 or A2 so as to cancel an output of the alarm signal when the tap coefficient decreased to a signal level at which the tap coefficient is not likely to overflow while the alarm signal is being outputted.

Each of the selectors 5216 and 5217 selects the alarm activating reference signal A1 (A2) as a reference signal that is to be outputted to the comparator(s) 5211 through 5213 until a signal level of the tap coefficient (any one of a1 through i1, a2 through i2, a3 through i3 or a4 through i4) exceeds a signal level of the alarm activating reference signal A1. When the signal level of the tap coefficient exceeds the alarm activating reference signal A1 (A2), each of the selectors 5216 and 5217 sets the alarm cancelling reference signal B1 (B2) as the reference signal that is to be outputted to the comparator(s) 5211 through 5213. When the tap coefficient drops below the alarm cancelling reference signal B1 (B2), each of the selectors 5216 and 5217 is so switched as to select again the alarm activating reference signal A1 as the reference signal that is to be outputted to the comparator(s) 5211 through 5213.

In the above case, relationships in terms of magnitude among the alarm activating reference signals A1 and A2, and the alarm cancelling reference signals B1 and B2 can be expressed as $|B1|<|A1|$, $|B2|<|A2|$, $|A1|<|A2|$ and $|B1|<|B2|$.

The two comparators 5211 and 5213 among the three comparators 5211 through 5213 compare outputs of the tap coefficients (a1 and c1, for example) selected by the respective selectors 5111 and 5113 with the alarm activating reference signal A1 or the alarm cancelling reference signal B1 from the selector 5216 of the reference signal setting unit 5215, respectively. The remaining comparator 5212 compares an output of the tap coefficient (b1, for example) selected by the selector 5112 with the alarm activating reference signal A2 or the alarm cancelling reference signal from the selector 5217 of the reference signal setting unit 5215. Each of the comparators 5211 through 5213 selectively outputs a signal having a higher level between the compared signals to the AND gate 5214.

The AND gate 5214 outputs the alarm signal for controlling a switching condition of the errorless switch 11 (refer to FIG. 2) to the line switching control apparatus 12 (refer to FIG. 2) on the basis of a result of comparison by each of the comparators 5211 through 5213. In practice, the AND gate 5214 obtains an AND of three outputs from the comparators 5211 through 5213, outputs the alarm signal (ALM) if there is even one signal having a higher level than that of the alarm activating reference signal A1 or A2 of the selector 5216 or 5217 among the three outputs, after that, cancels an output of the alarm signal when three outputs all drop below a level of the alarm cancelling reference signal B1 or B2.

In the alarm signal detecting unit 105 having the above structure, the tap coefficients a1 through h1 obtained by the transversal equalizer 102 are inputted to each of the selectors 5111 through 5113. In the selector 5111, the tap coefficients are successively selected in order of, for example, a1→b1→ . . . →h1 one by one according to the control signal (0→1→2 → . . . →8) of the divide-by-9 counter 5116 outputted continuously from the tap coefficient selection control unit 5120, and successively outputted to the comparator 5211.

In the selector 5112, signals (1→2→ . . . →8 →0) each obtained by delaying the control signal from the counter 5116 by the flip-flop 5118 by one clock are successively inputted from the tap coefficient selection control unit 5120 so that the tap coefficients are selected in order of b1→c1→ . . . →h1→a1 one by one and outputted to the comparator 5212.

In the selector 5113, signals (2→3→ . . . →8→1) obtained by further delaying the control signal from the counter 5116 by the flip-flop 5118 are inputted from the tap coefficient selection control unit 5120 so that the tap coefficients are selected one by one in order of c1→d1→ . . . →h1→a1→b1 and outputted to the comparator 5213.

In consequence, the tap coefficients inputted to each of the comparators 5211 through 5213 in the first stage are a1, b1 and c1.

In each of the comparators 5211 through 5213, a signal level of the tap coefficient a1, b1 or c1 is compared with the alarm activating reference signal A1 or A2 set in the selector 5216 or 5217 of the reference signal setting unit 5215, then a signal having a higher level is outputted to the AND gate 5214.

In the AND gate 5214, an AND of three signals from the comparators 5211 through 5213 is obtained. If there is even one tap coefficient having a signal level higher than the signal level of the reference signal A1 or A2 set in the selectors 5216 or 5217 among the successive three tap coefficients a1, b1 and c1, the alarm signal (ALM) is outputted to the line switching control apparatus 12.

The alarm signal is simultaneously fed back to the counter 5116 in the tap coefficient selection control unit 5120 and the selectors 5216 and 5217 of the reference signal setting unit 5215, whereby an operation (a counting) of the counter 5116 is stopped, and the tap coefficients (a1, b1 and c1) having been selected when the output of the selector 5216 or 5217 exceeded the signal level A1 or A2 (the switching reference signal level) of the reference signal are so controlled to be continuously outputted from the selectors 5111 through 5113.

After that, in the case of the tap coefficients (b1, c1 and d1) or (c1, d1, and e1) or . . . selected in the selectors 5111 through 5113, if there is even one tap coefficient having a signal level higher than the signal level A1 or A2 of the reference signal set in the selector 5216 or 5217 in the reference signal setting unit 5215 among the successive three tap coefficients, the alarm signal is outputted to the line switching control apparatus 12, similarly. After the alarm signal has been outputted, the selectors 5216 and 5217 are so set that the alarm cancelling signals B1 and B2 are selected and outputted from the respective selectors 5216 and 5217.

When receiving the alarm signal, the line switching control apparatus 12 outputs a switching signal for controlling the errorless switch 11 based thereon, thereby switching the transmission path from the active receiving system 10-1 to any one of the standby receiving systems 10-2 through 10-N before any one of the tap coefficients a1 through i1 of the transversal equalizer 102 comes to overflow and the active receiving system 10-1 is therefore disconnected.

After the alarm signal has been outputted to the line switching apparatus 12 as above, the tap coefficients a1, b1 and c1 having been selected when the output of any one of the selectors 5111 through 5113 (that is the tap coefficient) exceeded the alarm activating reference signal A1 or A2 are continuously outputted from the selectors 5111 through 5113. These tap coefficients a1, b1 and c1 are compared with the alarm releasing reference signal B1 or B2 in the comparators 5211 through 5213, respectively. If the signal levels of the tap coefficients a1, b1 and c1 all drop below the signal level of the alarm cancelling reference signal B1 or B2 (that is, when the signal levels of the tap coefficients fall down to a signal level where the tap coefficients are not likely to overflow), no alarm signal is outputted from the AND gate 5214 so that an output of the alarm signal is cancelled.

At that time, the reference signal setting unit 5215 is so set that the alarm activating reference signal A1 or A2 that is to be outputted to the comparators 5211 through 5213 is again selected. After that, if there is again a tap coefficient having a signal level higher than that of the alarm activating reference signal A1 or A2, the alarm signal is outputted to the line switching control apparatus 12 as above.

Figure 8:
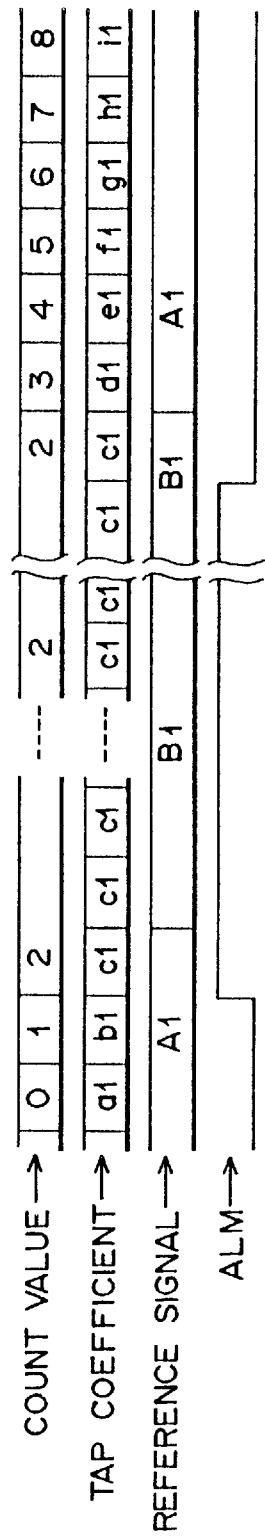
FIG. 8 is a timing chart illustrating operations of the tap monitoring circuit and the tap coefficient comparing circuit according to the first embodiment.

FIG. 8 shows a timing chart of the above operation in the case of the comparator 5211 as an example. As shown in FIG. 8, when a signal level of the tap coefficient c1 exceeds the alarm activating reference signal A1 from the selector 5216 while a counter value of the counter 5116 is 2, that is, while the tap coefficient selected by the selector 5111 in the tap monitoring circuit 511 is c1, the alarm signal becomes a High level and outputted. The alarm signal is fed back to the counter 5116 and the selector 5216 of the reference signal setting unit 5215, whereby a counting operation of the counter 5116 is terminated and the alarm cancelling reference signal B1 is set as the reference signal from the selector 5216.

After that, the tap coefficient c1 having been selected when it exceeded the alarm activating reference signal A1 as above is continuously outputted from the selector 5111 to the comparator 5211. When the tap coefficient c1 drops below the alarm cancelling reference signal B1, the counting by the counter is resumed, the alarm activating signal A1 is selected as the reference signal to be outputted to the comparator 5211, the alarm signal becomes a Low level, and an output of the alarm signal is cancelled.

According to the radio receiving apparatus of this embodiment, the alarm signal (the alarm predicting information) is detected from the tap coefficients of the transversal equalizer (an equalizer) 102 and a switching condition of the errorless switch (a changeover switch) 11 is controlled on the basis of the alarm signal as above so that it is possible to switch the active receiving system 10-1 to the standby receiving system 10-2 before the active receiving system 10-1 is suddenly disconnected. This embodiment therefore has an advantage to largely reduce a hit rate of the circuit (the receiving system) if a high-performance transversal equalizer 102 is used therein.

In this embodiment, the tap coefficients (the alarm predicting information) of the transversal equalizer 102 are detected, the alarm signal is obtained on the basis of the tap coefficients, and a switching is thereby performed between the active receiving system 10-1 and the standby receiving system 10-2. It is alternatively possible to detect the tap coefficients using another equalizer such as a decision feedback equalizer (DFE) so long as the tap coefficients can be detected. In the case of an equalizer that cannot detect the tap coefficients, it is possible to detect the alarm signal form the alarm predicting information and switch the transmission path of the receiving system on the basis of the alarm signal so long as the alarm predicting information such as the tap coefficients can be detected.

(c) Description of Second Embodiment

Now, description will be made of a second embodiment of this invention referring to the drawings.

Figure 9:
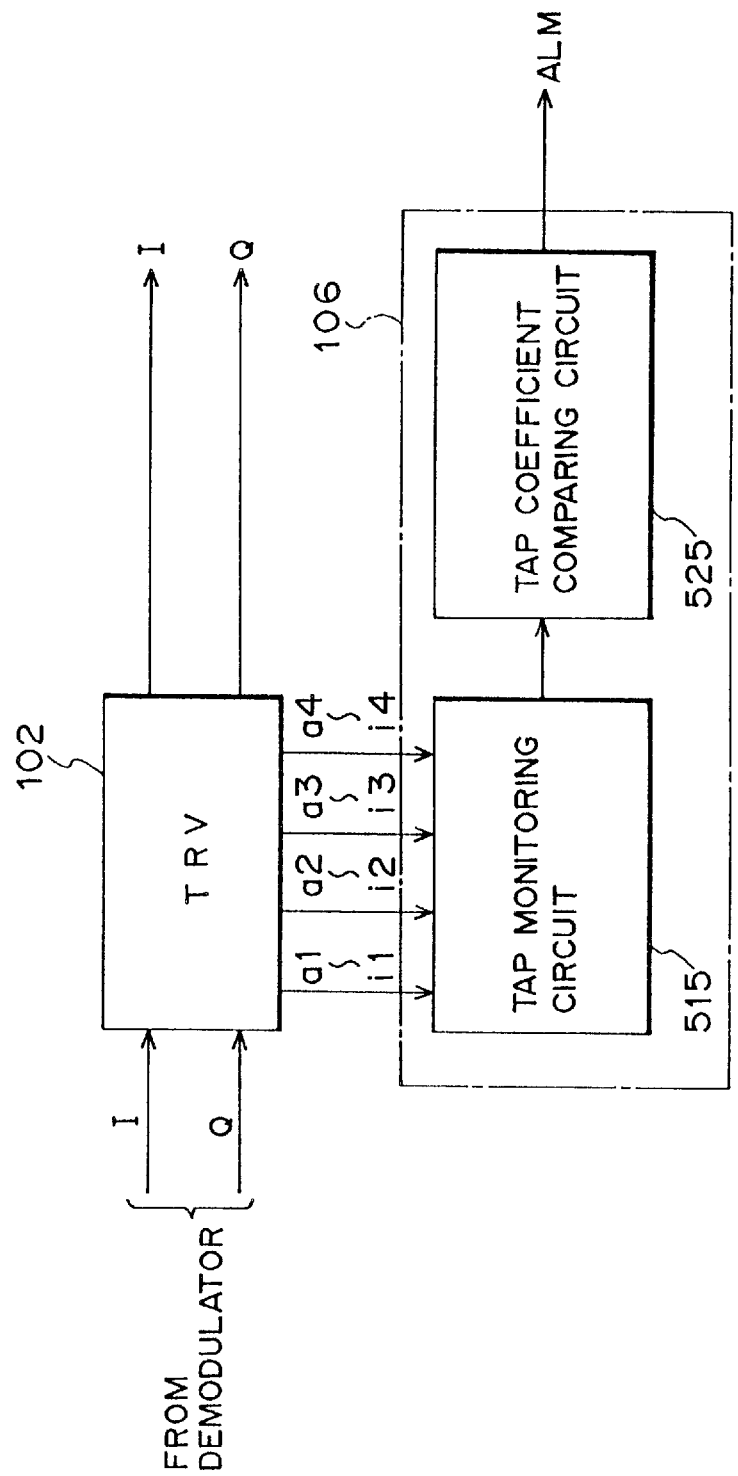
FIG. 9 is a block diagram of an essential part of a radio receiving apparatus according to a second embodiment of this invention.

In the above-described radio receiving apparatus according to the first embodiment, the alarm signal detecting unit 105, which is an essential part of this invention, is configured with four circuit units 51 through 54 including the tap monitoring circuits 511 through 514 and the tap coefficient comparing circuits 521 through 524, respectively. According to the second embodiment, the alarm signal detecting circuit 105 is configured as an alarm signal detecting unit 106 including one tap monitoring circuit (a tap coefficient detecting means) 515 and one tap coefficient comparing circuit (a switching control means) 525, as shown in FIG. 9. A transversal equalizer (TRV) 102 is similar to that having been described in the first embodiment, whose structure is similar to that having been described with reference to FIGS. 3 through 5, too.

Figure 10:
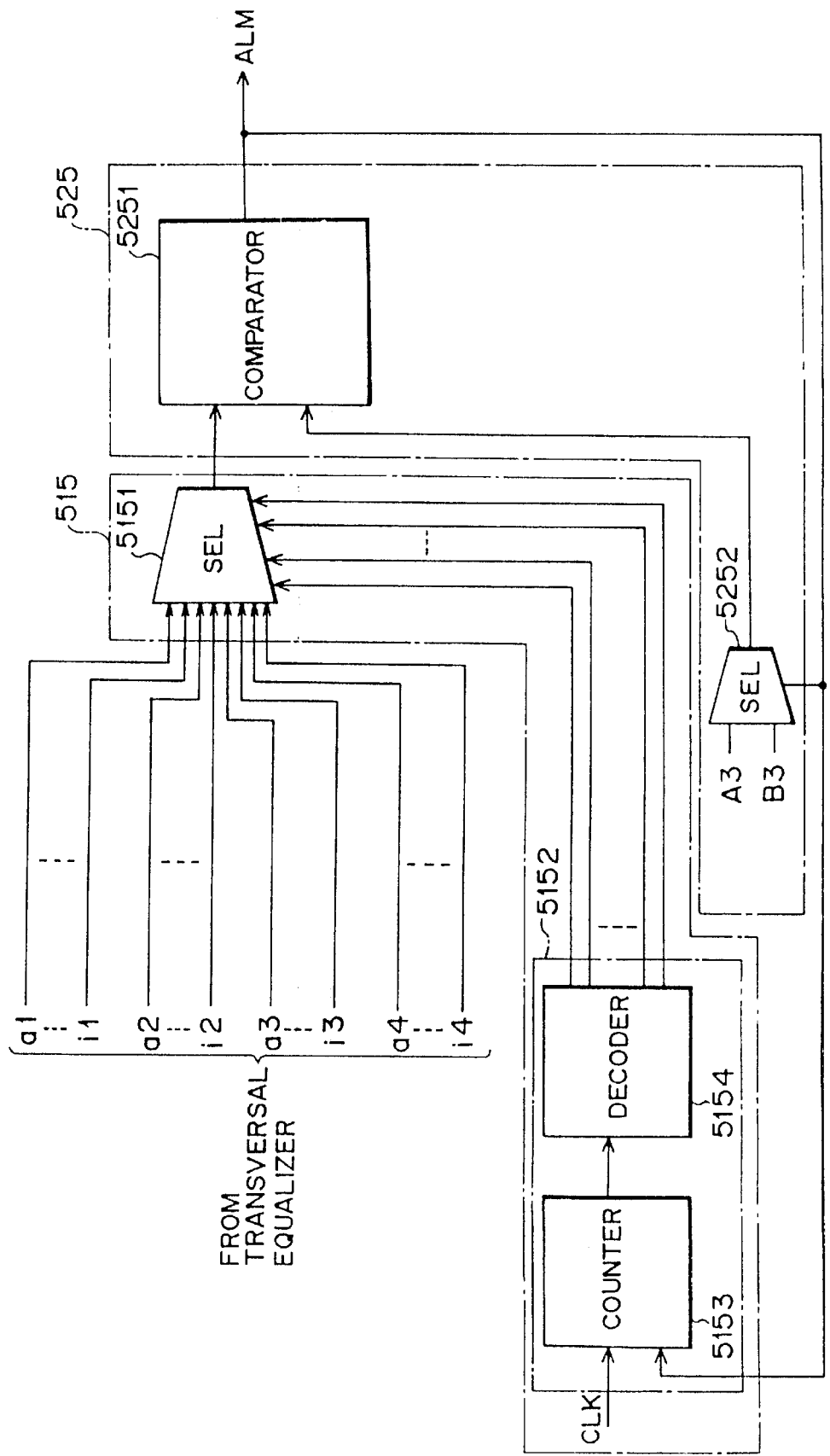
FIG. 10 is a block diagram of a tap monitoring circuit and a tap coefficient comparing circuit according to the second embodiment.

In this case, the tap monitoring circuit 515 has a selector (SEL) 5151 and a tap coefficient selection control unit 5152, as shown in FIG. 10. The tap coefficient comparing circuit 525 has a comparator (a comparing unit) 5251 and a selector (s switching information setting unit) 5252.

The selector 5151 selects, one by one, tap coefficients (alarm predicting information) a1 through i1, a2 through i2, a3 through i3 and a4 through i4 obtained in the transversal equalizer 102 according to a control signal from the tap coefficient selection control unit 5152 described later, and outputs them to the comparator 5251 in the similar manner to that in the first embodiment. The tap coefficient selection control unit 5152 outputs the control signal for controlling a selection of the tap coefficients by the selector 5151 as described above to the selector 5151.

To this end, the tap coefficient selection control unit 5152 has a divide-by-36 counter 5153 and a decoder 5154. The counter 5153 receives a clock (CLK) fed from the outside and outputs count values from 0 to 35 successively. The decoder 5154 successively selects the count values from the counter 5153 and outputs them to the selector 5151.

The comparator 5251 compares an output (the tap coefficient) from the selector 5151 in the tap monitoring circuit 515 with an alarm activating reference signal (alarm activation switching reference information) A3 or an alarm cancelling reference signal (alarm cancellation reference information) B3 set in the selector 5252 described later.

The selector 5252 selects the alarm activating reference signal A3 as a reference signal that is to be outputted to the comparator 5251 until a signal level of the tap coefficient (any one of a1 through i1, a2 through i2, a3 through i3 and a4 through i4) detected in the tap monitoring circuit 515 exceeds a signal level of the alarm activating reference signal A3, sets the alarm cancelling reference signal B3 as the reference signal that is to be outputted to the comparator 5251 when the signal level of the tap coefficient exceeds the alarm activating reference signal A3, and is switched to select again the alarm activating reference signal A3 as the reference signal that is to be outputted to the comparator 5251 when the tap coefficient drops below the alarm cancelling reference signal B3.

Figure 11:
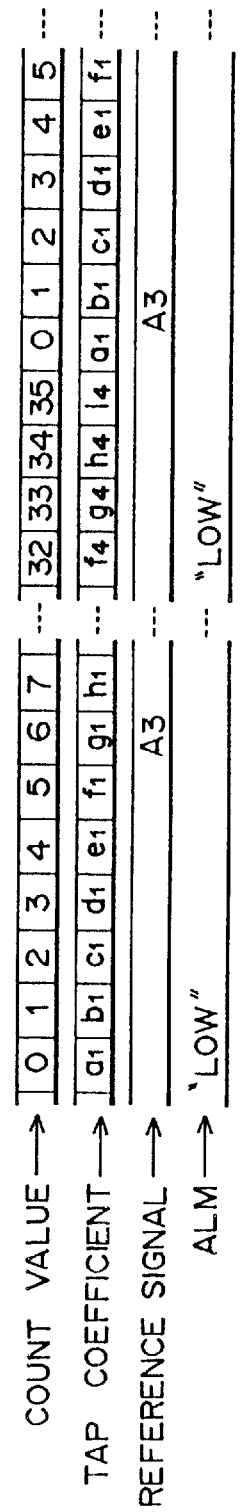
FIG. 11 is a timing chart illustrating operations of the tap monitoring circuit and the tap coefficient comparing circuit according to the second embodiment.

In the tap monitoring circuit 515 and the tap coefficient comparing circuit 525 with the above structure according to this embodiment, when the tap coefficients a1 through i1, a2 through i2, a3 through i3 and a4 through i4 obtained in the transversal equalizer 102 are inputted to the selector 5151 of the tap monitoring circuit 515, the tap coefficients are successively selected one by one by the selector 5151 according to the count values of the counter 5153 selected by the decoder 5152 of the tap coefficient selection control unit 5152, and outputted to the comparator 5251 of the tap coefficient comparing circuit 525. Incidentally, FIG. 11 is a timing chart showing this operation in the same way as the first embodiment.

In the comparator 5251, the tap coefficient (any one of a1 through i1, a2 through i2, a3 through i3 and a4 through i4) selected (detected) by the selector 5151 of the tap monitoring circuit 515 with the alarm activating reference signal A3 or the alarm cancelling reference signal (the alarm cancellation reference information) B3 set by the selector 5252.

If a signal level of the tap coefficient exceeds the alarm reference signal A3 as a result of the above comparison, the alarm cancelling reference signal B3 as the reference signal that is to be outputted to the comparator 5251 is set by the selector 5252, and the alarm signal (ALM) is outputted to the line switching control apparatus 12 (refer to FIG. 2), in the similar manner to the first embodiment. On the basis of this alarm signal, the transmission line is switched from the active receiving system 10-1 to the standby receiving system 10-2.

After that, when the tap coefficient drops below the alarm cancelling reference signal B3, the alarm activating reference signal A3 is again selected as the reference signal that is to be outputted to the comparator 5251 by the selector 5252. When the tap coefficient again exceeds the alarm activating reference signal A3, the alarm signal is outputted to the line switching control apparatus 12 in the same manner as above to switch the transmission path.

As above, the radio receiving apparatus according to this embodiment has the similar advantage to the first embodiment that the alarm signal can be detected from the tap coefficients (the alarm predicting information) of the transversal equalizer to control a switching condition of the errorless switch (the changeover switch) 11 on the basis of the alarm signal.

It is alternatively possible in this embodiment to use another equalizer, for example, a decision feedback equalizer (DFE) instead of the transversal equalizer (the equalizer) 102 so long as it can detect the tap coefficients. It should be noted that a DFE is merely one type of transversal equalizer. In the case of an equalizer which cannot detect the tap coefficients, it is possible to detect the alarm signal form alarm predicting information so long as it can detect the alarm predicting information such as the tap coefficients so as to switch the transmission line of the receiving system on the basis of the alarm signal.

What is claimed is:

1. A radio receiving apparatus having an active receiving system and a standby receiving system having respective transversal equalizers and a changeover switch for performing switching between said active receiving system and said standby receiving system comprising:

an alarm predicting information detecting means for detecting alarm predicting information showing a sign of disconnection of said receiving system obtained in each of said transversal equalizers; and a switching control means for controlling a switching condition of said changeover switch on the basis of said alarm predicting information detected by said alarm predicting information detecting means.

2. The radio receiving apparatus according to claim 1, wherein said switching control means comprising:

a switching reference information setting unit;

a comparing unit for comparing said alarm predicting information detected by said alarm predicting information detecting means with switching reference information set by said switching reference information setting unit; and a control unit for controlling a switching condition of said changeover switch on the basis of a result of the comparison by said comparing unit.

3. A radio receiving apparatus having an active receiving system and a standby receiving system having respective equalizers and a changeover switch for performing switching between said active receiving system and said standby receiving system comprising:

an alarm predicting information detecting means for detecting alarm predicting information in each of said equalizers;

a switching control means for controlling a switching condition of said changeover switch on the basis of said alarm predicting information detected by said alarm predicting information detecting means;

wherein said switch control means having a switching reference information setting unit, a comparing unit for comparing said alarm predicting information detected by said alarm predicting information detecting means with switching reference information set by said switching reference information setting unit, and a control unit for controlling a switching condition of said changeover switch on the basis of a result of the comparison by said comparing unit; and wherein said switching information setting unit is so configured as to be able to alarm activation switching reference information and alarm cancellation switching reference information, and said switching information setting unit has a switching unit for selecting said alarm activation switching reference information until said alarm predicting information detected by said alarm predicting information detecting means exceeds said alarm activation switching reference information, setting said alarm cancellation reference information when said alarm predicting information exceeds said alarm activation switching reference information, and again switching to said alarm activation switching reference information when said alarm predicting information drops below said alarm cancellation switching reference information.

4. The radio receiving apparatus according to claim 3, wherein said alarm activation switching information is set at a level higher than that of said alarm cancellation switching reference information.

5. A radio receiving apparatus having an active receiving system and a standby receiving system having respective equalizers and a changeover switch for performing switching between said active receiving system and said standby receiving system comprising:

an alarm predicting information detecting means for detecting alarm predicting information in each of said equalizers; and a switching control means for controlling a switching condition of said changeover switch on the basis of said alarm predicting information detected by said alarm predicting information detecting means;

wherein said alarm predicting information detecting means is configured as a tap coefficient detecting means for detecting tap coefficients in each of said equalizers, and said switching control means controls a switching condition of said changeover switch on the basis of said tap coefficients detected by said tap coefficient detecting means.

6. The radio receiving apparatus according to claim 5, wherein said tap coefficient detecting means has a selector for selecting said tap coefficients obtained from said equalizer, and a tap coefficient selection control unit for controlling selection of said tap coefficients by said selector;

said switching control unit has a switching reference level setting unit, a comparing unit for comparing an output from said selector in said tap coefficient detecting means with a switching reference level set by said switching reference level setting unit, and a control unit for controlling a switching condition of said changeover switch on the basis of a result of comparison by said comparing unit; and said tap coefficient selection control unit is so configured that said tap coefficient having been selected when the output of said selector exceeded said switching reference level is continuously outputted from said selector.

7. A radio receiving apparatus having an active receiving system and a standby receiving system having respective equalizers and a changeover switch for performing switching between said active receiving system and said standby receiving system comprising:

an alarm predicting information detecting means for detecting alarm predicting information in each of said equalizers; and a switching control means for controlling a switching condition of said changeover switch on the basis of said alarm predicting information detected by said alarm predicting information detecting means;

wherein said alarm predicting information detecting means is configured as a tap coefficient detecting means for detecting simultaneously plural tap coefficients in said equalizers, and said switching control means is so configured as to control a switching condition of said changeover switch on the basis of said plural tap coefficients detected by said tap coefficient detecting means.

8. The radio receiving apparatus according to claim 7, wherein said tap coefficient detecting means has plural selectors and a tap coefficient selection control unit for controlling selection of said tap coefficients by said selectors so as to simultaneously detect said plural tap coefficients from said equalizers;

said switching control means has a switching reference level setting unit, a comparing unit for comparing an output from said each of said selectors with a switching reference level set by said switching reference level setting unit, and a control unit for controlling a switching condition of said changeover switch on the basis of a result of comparison by said comparing unit; and said tap coefficient selection control unit is so configured that said tap coefficients having been selected when the output of said selector exceeded said switching reference level are continuously outputted from said selector.

9. The radio receiving apparatus according to claim 8, wherein said switching reference information setting unit is so configured as to be able to set plural switching reference levels;

said comparing unit has plural comparators each for comparing an output of the corresponding selector in said tap coefficient detecting means with a required switching reference level set by said switching reference level setting unit, and an AND circuit for obtaining an AND of results of comparison by said comparators.

10. A method for switching receiving systems in a radio receiving apparatus having an active receiving system and a standby receiving system having respective transversal equalizers and a changeover switch for performing switching between said active receiving system and said standby receiving system comprising the steps of:

detecting alarm predicting information showing a sign of disconnection of said receiving system obtained in each of said transversal equalizers; and controlling a switching condition of said changeover switch on the basis of the alarm predicting information.

* * * * *